US009159158B2

(12) United States Patent
Aila et al.

(10) Patent No.: US 9,159,158 B2
(45) Date of Patent: Oct. 13, 2015

(54) SURFACE CLASSIFICATION FOR POINT-BASED RENDERING WITHIN GRAPHICS DISPLAY SYSTEM

(75) Inventors: Timo Oskari Aila, Tuusula (FI); Jaakko Tapani Lehtinen, Helsinki (FI); Samuli Matias Laine, Vantaa (FI)

(73) Assignee: NVIDIA CORPORATION, Santa Clara, CA (US)

( * ) Notice: Subject to any disclaimer, the term of this patent is extended or adjusted under 35 U.S.C. 154(b) by 263 days.

(21) Appl. No.: 13/553,525

(22) Filed: Jul. 19, 2012

(65) Prior Publication Data

US 2014/0022237 A1 Jan. 23, 2014

(51) Int. Cl.
G06T 13/00 (2011.01)
G06T 15/00 (2011.01)
G06T 15/06 (2011.01)

(52) U.S. Cl.
CPC .............. *G06T 15/06* (2013.01); *G06T 2210/56* (2013.01)

(58) Field of Classification Search
CPC ........... G06F 1/1626; G06F 3/01; G06F 3/03; G06F 3/0346; G01N 21/55; G03F 1/144; G03F 1/26; G03F 7/70283; G03F 7/70433; G06T 15/06; G06T 2210/56
See application file for complete search history.

(56) References Cited

U.S. PATENT DOCUMENTS

| | | |
|---|---|---|
| 4,897,806 A | 1/1990 | Cook et al. |
| 5,113,493 A | 5/1992 | Crosby |
| 5,222,203 A | 6/1993 | Obata |
| 5,239,624 A | 8/1993 | Cook et al. |
| 5,289,565 A | 2/1994 | Smith et al. |
| 5,299,298 A | 3/1994 | Elmquist et al. |
| 5,357,579 A | 10/1994 | Buchner et al. |
| 5,384,667 A | 1/1995 | Beckwith |
| 5,402,534 A | 3/1995 | Yeomans |
| 5,465,119 A | 11/1995 | Demos |
| 5,684,935 A | 11/1997 | Demesa, III et al. |
| 5,729,672 A | 3/1998 | Ashton |
| 5,737,027 A | 4/1998 | Demos |

(Continued)

FOREIGN PATENT DOCUMENTS

| | | |
|---|---|---|
| CN | 1856805 | 11/2006 |
| CN | 101599181 | 12/2009 |
| WO | WO2012115711 | 8/2012 |

OTHER PUBLICATIONS

Gernot Schaufler and Henrik Wann Jensen, "Ray Tracing Point Sampled Geometry", In Proceedings of the Eurographics Workshop on Rendering Techniques 2000, p. 319-328, London, UK, 2000. Springer-Verlag.*

(Continued)

*Primary Examiner* — Sing-Wai Wu

(57) ABSTRACT

A method including casting a ray from a point toward a point-based three dimensional scene. The scene includes memory resident objects with object surfaces and a first splat and a second splat associated with the object surfaces. The first splat and the second splat have a position and a normal vector. The method also includes forming an event line through the first splat and the second splat. The event line intersects the first splat and the second splat. The method further includes determining whether a visibility conflict exists between the first splat and the second splat. The method also includes separating the first splat and the second splat to different object surfaces if the visibility conflict exists, otherwise merging the first splat and the second splat to a single object surface.

17 Claims, 7 Drawing Sheets

(56) References Cited

U.S. PATENT DOCUMENTS

| | | | |
|---|---|---|---|
| 5,809,219 A | 9/1998 | Pearce et al. |
| 5,870,096 A | 2/1999 | Anjyo et al. |
| 5,973,700 A | 10/1999 | Taylor et al. |
| 5,982,385 A | 11/1999 | Fish et al. |
| 6,034,667 A | 3/2000 | Barrett |
| 6,211,882 B1 | 4/2001 | Pearce et al. |
| 6,300,956 B1 | 10/2001 | Apodaca et al. |
| 6,618,048 B1 | 9/2003 | Leather |
| 6,636,214 B1 | 10/2003 | Leather et al. |
| 6,700,586 B1 | 3/2004 | Demers |
| 6,707,458 B1 | 3/2004 | Leather et al. |
| 6,717,577 B1 | 4/2004 | Cheng et al. |
| 6,720,975 B1 | 4/2004 | Dietrich, Jr. |
| 6,811,489 B1 | 11/2004 | Shimizu et al. |
| 6,867,781 B1 | 3/2005 | Van Hook et al. |
| 6,885,384 B2 | 4/2005 | Deering et al. |
| 6,999,100 B1 | 2/2006 | Leather et al. |
| 7,002,591 B1 | 2/2006 | Leather et al. |
| 7,034,828 B1 | 4/2006 | Drebin et al. |
| 7,050,066 B2 | 5/2006 | Ohta |
| 7,061,502 B1 | 6/2006 | Law et al. |
| 7,075,545 B2 | 7/2006 | Van Hook et al. |
| 7,119,813 B1 | 10/2006 | Hollis et al. |
| 7,133,041 B2 | 11/2006 | Kaufman et al. |
| 7,133,047 B2 | 11/2006 | Pallister |
| 7,136,081 B2 | 11/2006 | Gritz et al. |
| 7,176,919 B2 | 2/2007 | Drebin et al. |
| 7,184,059 B1 | 2/2007 | Fouladi et al. |
| 7,187,379 B2 | 3/2007 | Keller |
| 7,196,710 B1 | 3/2007 | Fouladi et al. |
| 7,205,999 B2 | 4/2007 | Leather |
| 7,230,618 B2 | 6/2007 | Keller |
| 7,307,638 B2 | 12/2007 | Leather et al. |
| 7,307,640 B2 | 12/2007 | Demers et al. |
| 7,317,459 B2 | 1/2008 | Fouladi et al. |
| 7,362,332 B2 | 4/2008 | Gritz |
| 7,446,780 B1 | 11/2008 | Everitt et al. |
| 7,453,460 B2 | 11/2008 | Keller |
| 7,453,461 B2 | 11/2008 | Keller |
| 7,477,261 B2 | 1/2009 | Pallister |
| 7,483,010 B2 | 1/2009 | Bai et al. |
| 7,499,054 B2 | 3/2009 | Keller |
| 7,538,772 B1 | 5/2009 | Fouladi et al. |
| 7,576,748 B2 | 8/2009 | Van Hook et al. |
| 7,616,200 B1 | 11/2009 | Heinrich et al. |
| 7,623,726 B1 | 11/2009 | Georgiev |
| 7,697,010 B2 | 4/2010 | Pallister |
| 7,701,461 B2 | 4/2010 | Fouladi et al. |
| 7,742,060 B2 | 6/2010 | Maillot |
| 7,961,970 B1 | 6/2011 | Georgiev |
| 7,973,789 B2 | 7/2011 | Cook |
| 7,995,069 B2 | 8/2011 | Van Hook et al. |
| 8,098,255 B2 | 1/2012 | Fouladi et al. |
| 8,970,584 B1 | 3/2015 | Aila et al. |
| 2003/0083850 A1 | 5/2003 | Schmidt et al. |
| 2003/0234789 A1 | 12/2003 | Gritz |
| 2006/0101242 A1 | 5/2006 | Siu et al. |
| 2007/0046686 A1 | 3/2007 | Keller |
| 2008/0001961 A1 | 1/2008 | Roimela et al. |
| 2008/0244241 A1 | 10/2008 | Barraclough et al. |
| 2009/0167763 A1 | 7/2009 | Waechter et al. |
| 2011/0090337 A1 | 4/2011 | Klomp et al. |
| 2012/0218264 A1 | 8/2012 | Clarberg et al. |
| 2012/0293515 A1 | 11/2012 | Clarberg et al. |
| 2012/0327071 A1 | 12/2012 | Laine et al. |
| 2013/0321420 A1 | 12/2013 | Laine et al. |

OTHER PUBLICATIONS

Lars Linsen, Karsten Muller and Paul Rosenthal, "Splat-based Ray Tracing of Point Clouds", Journal of WSCG 15: 51-58, 2007.*

Schaufler, et al; "Ray Tracing Point Sampled Geometry", In Proceedings of the Eurographics Workshop on Rendering Techniques 2000, p. 319-328, London, UK, 2000. Springer-Verlag.

Linsen, et al; "Splat-based Ray Tracing of Point Clouds", Journal of WSCG 15: 51-58, 2007.

McGuire, et al; "Hardware-Accelerated Global Illumination by Image Space Photon Mapping", HPG 2009, New Orleans, Louisiana, Aug. 1-3, 2009.

Moller., et al., "Stochastic Rasterization Using Time-Continuous Triangles," ACM, Jan. 2007, pp. 1-11.

Hou, Q., et al, "Micropolygon Ray Tracing with Defocus and Motion Blur," ACM Transactions on Graphics (TOG), vol. 29, Article 64, Jul. 2010, pp. 1-10.

Laine, S., et al., "Clipless Dual-Space Bounds for Faster Stochastic Rasterization," ACM Transactions on Graphics (TOG), vol. 30, Issue 4, Article 106, Jul. 2011, pp. 1-6.

Kayvon Fatahalian, Edward Luong, Solomon Boulos, Kurt Akeley, William R. Mark, and Pat Hanrahan, "Data-Parallel Rasterization of Micropolygons with Defocus and Motion Blur," Proc. High Performance Graphics 2009.

Tomas Akenine-Moller, Jacob Munkberg, and Jon Hasselgren, "Stochastic rasterization using time-continuous triangles," Proc. Graphics Hardware 2009.

P. Haberli and K. Akeley, "The Accumulation Buffer: Hardware Support for High Quality Rendering," In Proc. SIGGRAPH 1990. Pp.309-318.

Wang Liqing, "Research on Algorithms of Computational Geometry in GIS," China Maters Thesis Full-Text Database 2009. pp. 7-13.

Sharat Chandran, Parag Chaudhuri, Sriram Kashyap, Rhushabh Goradia, GPU-Based Ray Tracing of Splats, Conference Paper, 2010-09, 101-108, IEE, Hangzhou.

Lars Linsen, Karsten Muller, Paul Rosenthal, Splat-Based Ray Tracing of Point Clouds, Article, 2007, 49-58, vol. 15 Issue 1-3, Vaclav Skala-UNION Agency, Czech Republic.

* cited by examiner

SURFACE CLASSIFICATION FOR POINT-BASED RENDERING WITHIN GRAPHICS DISPLAY SYSTEM

CROSS-REFERENCE TO RELATED APPLICATION

This application is related to patent application, "LIGHT TRANSPORT CONSISTENT SCENE SIMPLIFICATION WITHIN GRAPHICS DISPLAY SYSTEM," concurrently filed with this application, Ser. No. 13/553,483, which is herein incorporated by reference in its entirety.

BACKGROUND OF THE INVENTION

In image rendering in computer graphics system, it is often desirable to render point-based geometry directly, e.g. without triangulation. However, a challenge exists in that unlike in triangle-based graphics, both the exact position and color of a surface within a scene are defined as a weighted average of nearby point samples. This makes it difficult to determine which surface, if any, a query ray may hit. Additionally, it is difficult to determine the visibility relationships among the point samples. Current solutions to these problems choose to ignore this difficulty and limit themselves to simple scenarios where point density is almost uniform and the scenes consist of a few simple objects. Unfortunately, these solutions fail in more complex scenes or when point density varies rapidly. However, a well-known solution is Räsänen's method. While Räsänen's method works well in a majority of cases, it is often too eager to merge point samples to the same surface and causes unpredictable light leaks between surfaces which may cause unwanted image artifacts.

BRIEF SUMMARY OF THE INVENTION

Accordingly, a need exists for a computer graphics method to classify point samples to their proper surface based on monitoring the relative visibility of the point samples as a viewpoint changes.

More specifically, embodiments of the present invention are directed towards a computer graphics method. The computer controlled method includes casting a ray from a point toward a point-based three dimensional scene. The scene includes memory resident objects with object surfaces and a first splat and a second splat associated with the object surfaces. The first splat and the second splat have a position and a normal vector. The method also includes forming an event line through the first splat and the second splat. The event line intersects the first splat and the second splat. The method further includes determining whether a visibility conflict exists between the first splat and the second splat. In some embodiments, the method may also include separating the first splat and the second splat to different object surfaces if the visibility conflict exists, otherwise merging the first splat and the second splat to a single object surface.

In another embodiment, the present invention is drawn to a computer readable storage medium having stored thereon, computer executable instructions that, if executed by a computer system cause the computer system to perform a method of ray tracing. The computer controlled method includes casting a ray from a point toward a point-based three dimensional scene. The scene includes memory resident objects with object surfaces and a first splat and a second splat associated with the object surfaces. The first splat and the second splat have a position and a normal vector. The method also includes forming an event line through the first splat and the second splat. The event line intersects the first splat and the second splat. The method further includes determining whether a visibility conflict exists between the first splat and the second splat. In some embodiments, the method may also include separating the first splat and the second splat to different object surfaces if the visibility conflict exists, otherwise merging the first splat and the second splat to a single object surface.

In yet another embodiment, the present invention is drawn to a system. The system comprises a processor coupled to a computer readable storage media using a bus and executing computer readable code which causes the computer system to perform a method of rendering an image. The computer controlled method includes casting a ray from a point toward a point-based three dimensional scene. The scene includes memory resident objects with object surfaces and a first splat and a second splat associated with the object surfaces. The first splat and the second splat have a position and a normal vector. The method also includes forming an event line through the first splat and the second splat. The event line intersects the first splat and the second splat. The method further includes determining whether a visibility conflict exists between the first splat and the second splat. In some embodiments, the method may also include separating the first splat and the second splat to different object surfaces if the visibility conflict exists, otherwise merging the first splat and the second splat to a single object surface.

BRIEF DESCRIPTION OF THE DRAWINGS

The embodiments of the present invention are illustrated by way of example, and not by way of limitation, in the figures of the accompanying drawings and in which like reference numerals refer to similar elements.

DETAILED DESCRIPTION OF THE INVENTION

Reference will now be made in detail to embodiments of the present invention, examples of which are illustrated in the accompanying drawings. While the present invention will be discussed in conjunction with the following embodiments, it will be understood that they are not intended to limit the present invention to these embodiments alone. On the contrary, the present invention is intended to cover alternatives, modifications, and equivalents which may be included with the spirit and scope of the present invention as defined by the appended claims. Furthermore, in the following detailed description of the present invention, numerous specific details are set forth in order to provide a thorough understanding of the present invention. However, embodiments of the present invention may be practiced without these specific details. In other instances, well-known methods, procedures, components, and circuits have not been described in detail so as not to unnecessarily obscure aspects of the present invention.

For expository purposes, the term "horizontal" as used herein refers to a plane parallel to the plane or surface of an object, regardless of its orientation. The term "vertical" refers to a direction perpendicular to the horizontal as just defined. Terms such as "above," "below," "bottom," "top," "side," "higher," "lower," "upper," "over," and "under" are referred to with respect to the horizontal plane.

Figure 1:
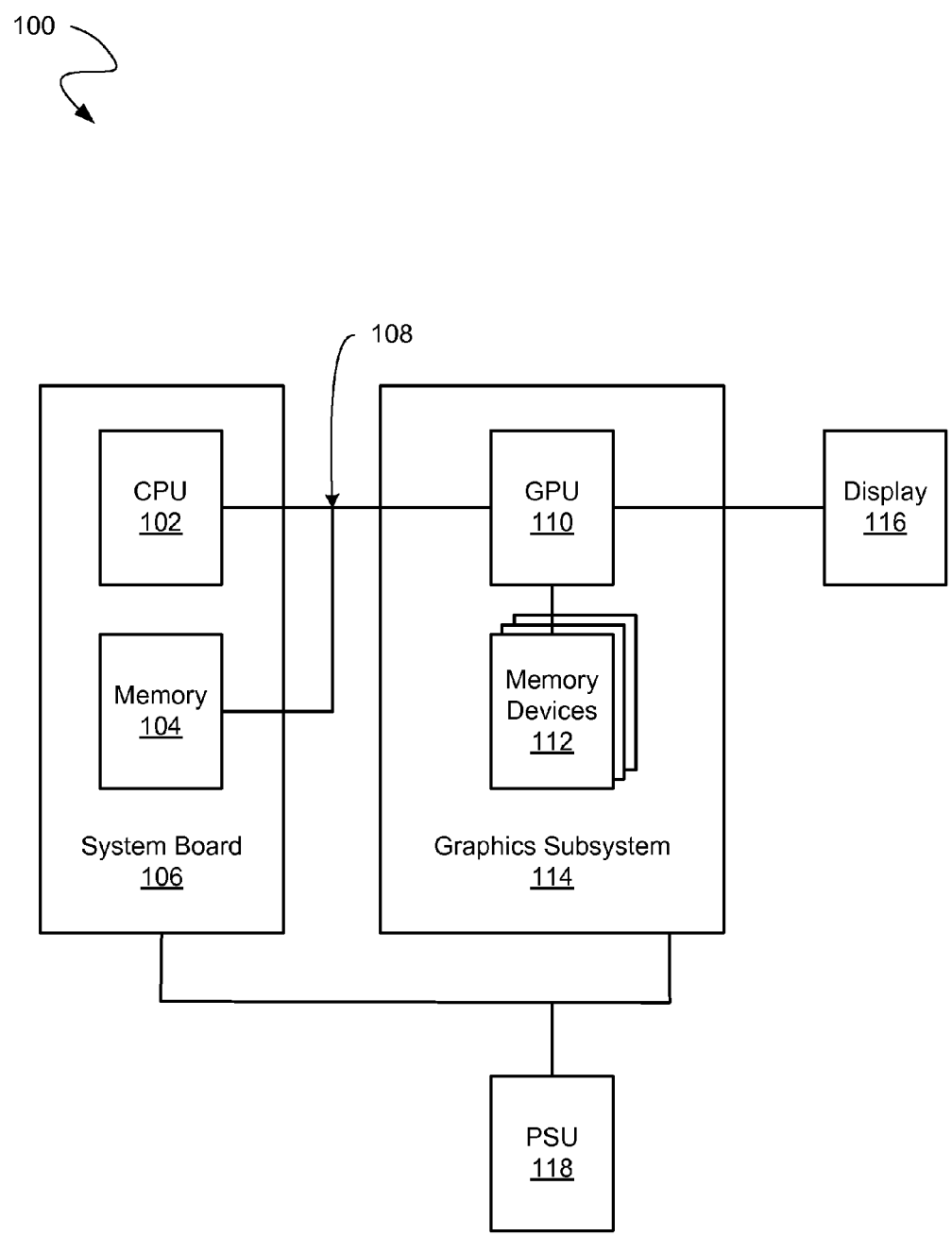
FIG. 1 shows an exemplary computer system, in accordance with one embodiment of the present invention.

FIG. 1 shows an exemplary computer system 100 in accordance with one embodiment of the present invention. Computer system 100 depicts the components in accordance with embodiments of the present invention providing the execution platform for certain hardware-based and software-based functionality, in particular, computer graphics rendering and display capability. In general, computer system 100 comprises a system board 106 including at least one central processing unit (CPU) 102 and a system memory 104. The CPU 102 can be coupled to the system memory 104 via a bridge component/memory controller (not shown) or can be directly coupled to the system memory 104 via a memory controller (not shown) internal to the CPU 102.

Computer system 100 also comprises a graphics subsystem 114 including at least one graphics processor unit (GPU) 110. For example, the graphics subsystem 114 may be included on a graphics card. The graphics subsystem 114 may be coupled to a display 116. One or more additional GPU(s) 110 can optionally be coupled to computer system 100 to further increase its computational power. The GPU(s) 110 may be coupled to the CPU 102 and the system memory 104 via a communication bus 108. The GPU 110 can be implemented as a discrete component, a discrete graphics card designed to couple to the computer system 100 via a connector (e.g., AGP slot, PCI-Express slot, etc.), a discrete integrated circuit die (e.g., mounted directly on a motherboard), or as an integrated GPU included within the integrated circuit die of a computer system chipset component (not shown). Additionally, memory devices 112 may be coupled with the GPU 110 for high bandwidth graphics data storage, e.g., the frame buffer. In an embodiment, the memory devices 112 may be dynamic random-access memory. A power source unit (PSU) 118 may provide electrical power to the system board 106 and graphics subsystem 114.

The CPU 102 and the GPU 110 can also be integrated into a single integrated circuit die and the CPU and GPU may share various resources, such as instruction logic, buffers, functional units and so on, or separate resources may be provided for graphics and general-purpose operations. The GPU may further be integrated into a core logic component. Accordingly, any or all the circuits and/or functionality described herein as being associated with the GPU 110 can also be implemented in, and performed by, a suitably equipped CPU 102. Additionally, while embodiments herein may make reference to a GPU, it should be noted that the described circuits and/or functionality can also be implemented and other types of processors (e.g., general purpose or other special-purpose coprocessors) or within a CPU.

System 100 can be implemented as, for example, a desktop computer system or server computer system having a powerful general-purpose CPU 102 coupled to a dedicated graphics rendering GPU 110. In such an embodiment, components can be included that add peripheral buses, specialized audio/video components, IO devices, and the like. Similarly, system 100 can be implemented as a portable device (e.g., cellphone, PDA, etc.), direct broadcast satellite (DBS)/terrestrial set-top box or a set-top video game console device such as, for example, the Xbox®, available from Microsoft Corporation of Redmond, Wash., or the PlayStation3®, available from Sony Computer Entertainment Corporation of Tokyo, Japan. System 100 can also be implemented as a "system on a chip", where the electronics (e.g., the components 102, 104, 110, 112, and the like) of a computing device are wholly contained within a single integrated circuit die. Examples include a hand-held instrument with a display, a car navigation system, a portable entertainment system, and the like.

Figure 2:
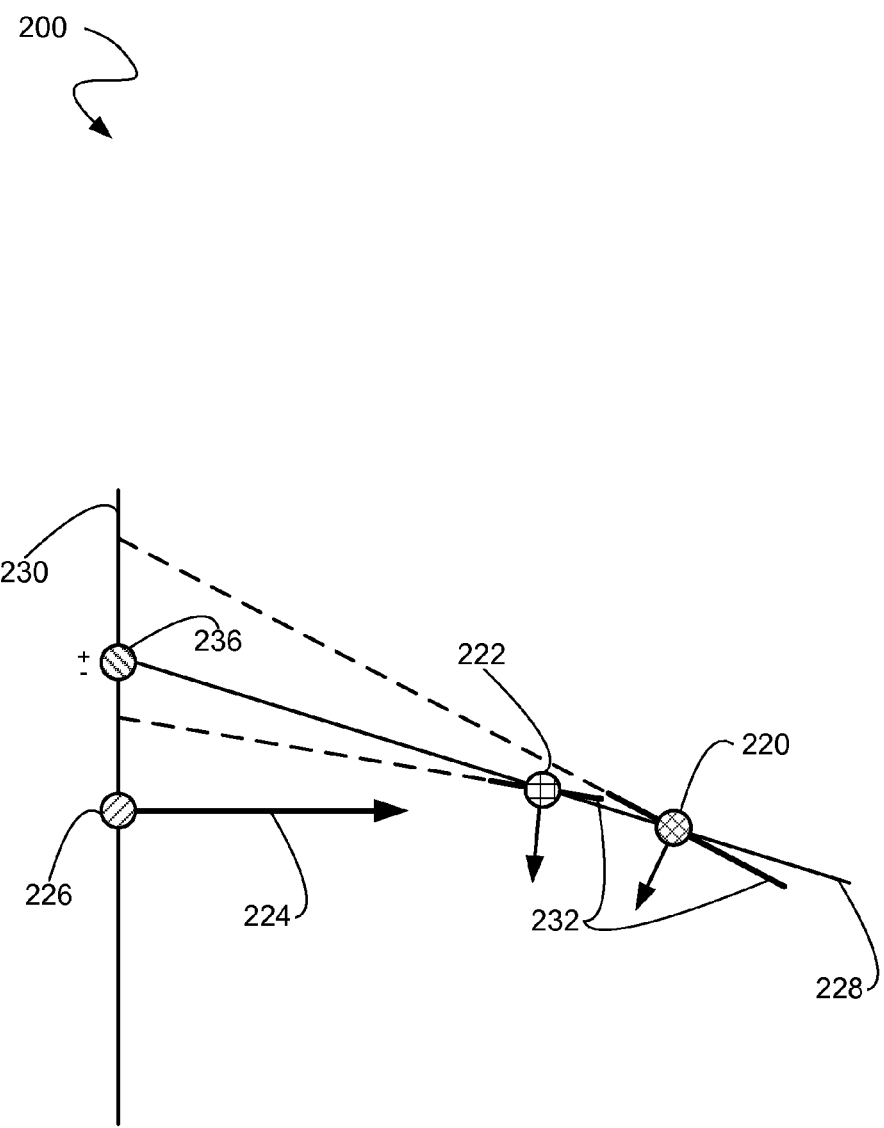
FIG. 2 depicts a first splat and a second splat within an exemplary point-based three dimensional scene, wherein a visibility conflict does not exist, in accordance with one embodiment of the present invention.

FIG. 2 depicts a first splat 220 and a second splat 222 within an exemplary point-based three dimensional scene 200 of a computer graphics display system, wherein a visibility conflict does not exist, in accordance with one embodiment of the present invention. The exemplary scene 200 may be represented in computer memory as graphics data stored therein. The point-based three dimensional scene 200 is a three dimensional model intended to be converted into a 2-D image by a computer graphics processing system for image display.

The point-based three dimensional scene 200 comprises a ray 224. The ray 224 is cast from a point (origin) 226 toward the scene 200. In an embodiment, the image is rendered using ray tracing, a technique for generating an image by tracing the path of light through pixels in an image plane and simulating the effects of its encounters with virtual objects.

The scene 200 also comprises objects with object surfaces (not shown). The first splat 220 and second splat 222 are associated with the object surfaces (not shown). The first splat 220 and second splat 222 are sample points within the scene 200 that are expressed in terms of circles on tangent planes 232 of intersection points between the ray 224 and the object surfaces of the object(s) (not shown). First splat 220 and second splat 222 also comprise both a position and a normal vector.

Embodiments of the present invention determine whether a visibility conflict exists between the first splat 220 and the second splat 222. A visibility conflict is determined as a situation where it is considered possible that two splats (point samples) can occlude each other in the vicinity of the ray 224. In other words, embodiments of the present invention determine whether a series of splats belong to the same object surface or belong to separate object surfaces within the scene 200. In accordance with ray tracing graphics rendering, ray 224 is cast toward the three dimensional scene 200. Once cast, the ray 224 may intersect with a surface of an object (not shown) within the scene 200. Next, an event line 228 is formed through the first splat 220 and the second splat 222. A plane 230 is perpendicular to a ray origin point 226 of the ray 224. The event line 228 intersects both the first splat 220 and the second splat 222. Event line 228 also intersects with plane 230 at an intersection point 236.

In one embodiment of the present invention, it is identified that a visibility conflict exists if intersection point 236 lies within a positive half-space of the first splat 220 and the second splat 222, or if intersection point 236 lies within a negative half-space of the first splat 220 and the second splat 222. FIG. 2 demonstrates that event line 228 cast through first splat 220 and second splat 222 intersects 236 with plane 230 outside the region of space where both first splat 220 and second splat 222 face forward or both first splat 220 and second splat 222 face backward. Thus, intersection point 236 does not lie within a positive half-space of the first splat 220 and the second splat 222 and also does not lie within a negative half-space of the first splat 220 and the second splat 222. Consequently, there is no visibility conflict and first splat 220 and second splat 222 are filtered together in the same object surface.

It can be appreciated that the exemplary scene 200 may include any number of splats to which the surface classification method of the present invention may be applied, and the invention is not limited to just two splats.

Figure 3:
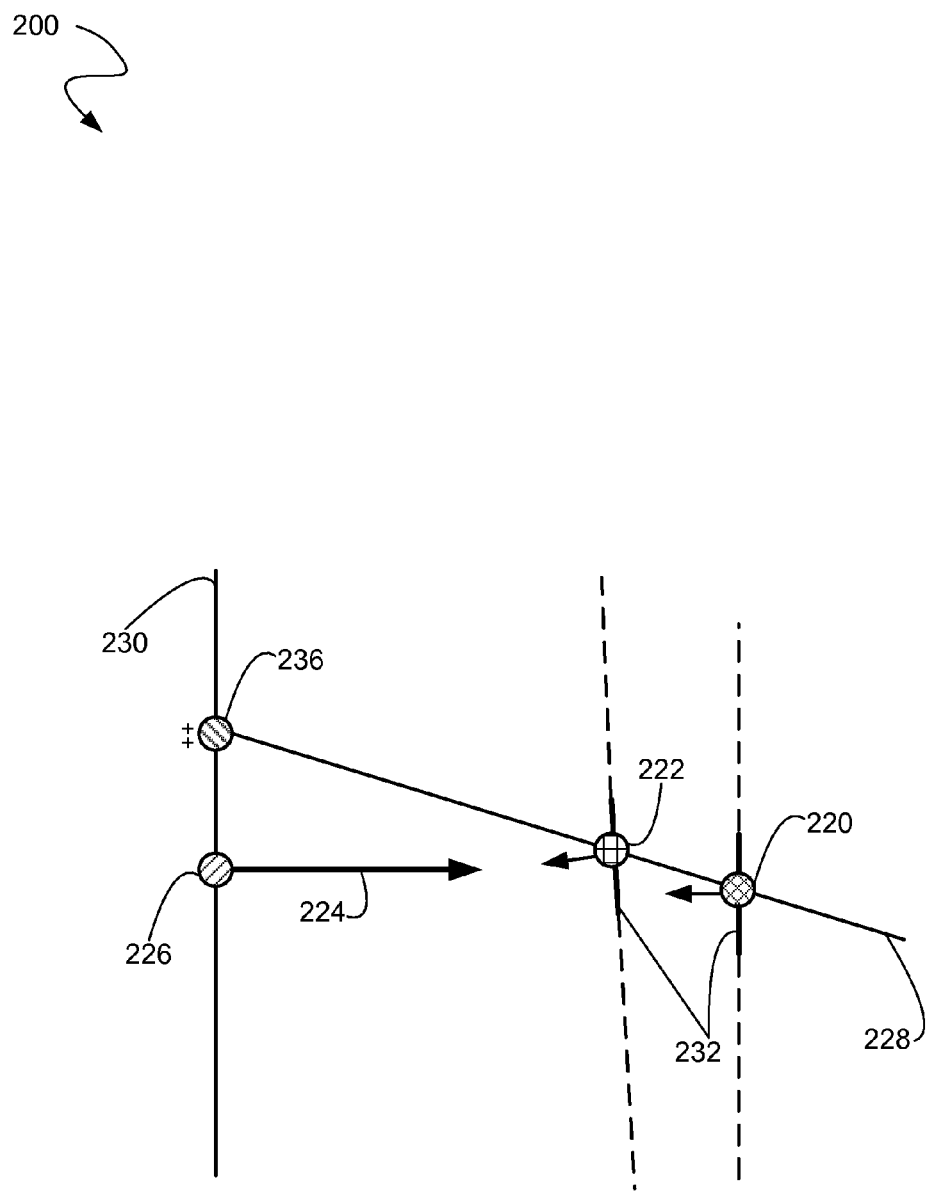
FIG. 3 depicts a first splat and a second splat within an exemplary point-based three dimensional scene, wherein a visibility conflict exists, in accordance with one embodiment of the present invention.

FIG. 3 depicts a first splat 220 and a second splat 222 within a point-based three dimensional exemplary scene 200, wherein a visibility conflict exists, in accordance with one embodiment of the present invention. FIG. 3 is similar to FIG. 2 with the exception that a visibility conflict exists. FIG. 3 demonstrates that event line 228 cast through first splat 220 and second splat 222 intersects 236 with plane 230 in the positive half-space of both first splat 220 and second splat 222. Consequently, there is a visibility conflict and first splat 220 and second splat 222 are determined to belong to different object surfaces (not shown).

It can be appreciated that event line 228 could also intersect 236 with plane 230 in the negative half-space of both first splat 220 and second splat 222. In this scenario, a visibility conflict would also exist and first splat 220 and second splat 222 would be determined to belong to different object surfaces (not shown).

The method described in FIG. 2 and FIG. 3 may be software implemented or implemented in hardware or both. Example pseudocode follows in Table 1 below:

TABLE 1

```
// start a new surface
Vec2i samplesInSurface = index range of all remaining samples
bool bConflict = false;
for(int i=samplesInSurface[0]; i<samplesInSurface[1] && !bConflict; i++)
{
    // any crossings with samples already in the current surface?
    for(int j=samplesInSurface[0]; j<i && !bConflict; j++)
    {
        // a pair of samples
        const ReconSample& s1 = samples[i];
        const ReconSample& s2 = samples[j];
        // two-sided primitives: flip the normal
        const Vec3f normal1 = s1.backface ? -s1.normal : s1.normal;
        const Vec3f normal2 = s2.backface ? -s2.normal : s2.normal;
        // same surface if intersection point not in ++ or --
        const Vec4f plane1(normal1, -dot(normal1,s1.position));
        const Vec4f plane2(normal2, -dot(normal2,s2.position));
        const Vec3f sep = s2.position – s1.position;
        const Vec3f pip = intersectRayPlane(p1,sep, lp.stplane);
        const float eps = 1e-3f;
        if((dot(plane1,Vec4f(pip,1))> eps &&
            dot(plane2,Vec4f(pip,1))> eps) ||
            (dot(plane1,Vec4f(pip,1))<-eps &&
            dot(plane2,Vec4f(pip,1))<-eps) )
            bConflict = true;
    }
    if(bConflict)
        samplesInSurface[1] = i;
}
```

The implementation of the pseudocode shown in Table 1 detects a conflict when two object surfaces are on top each other as seen from the origin of the ray, but allows merging of points that come from the same locally flat, convex, or concave object surface.

Figure 4:
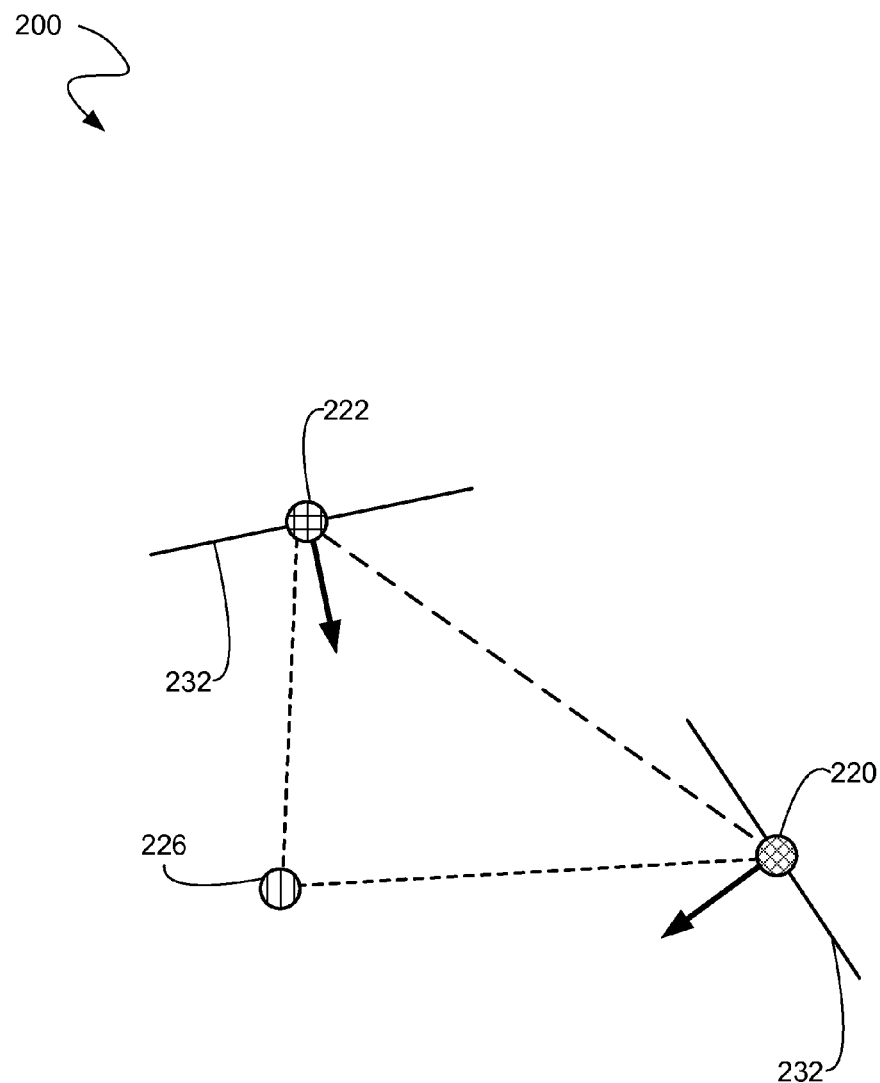
FIG. 4 depicts a first splat and a second splat within an exemplary point-based three dimensional scene, wherein a visibility conflict does not exist, in accordance with one embodiment of the present invention.

FIG. 4 depicts a first splat 220 and a second splat 222 within a point-based three dimensional exemplary scene 200, wherein a visibility conflict does not exist, in accordance with one embodiment of the present invention. In another embodiment of the present invention, a conflict may be determined based on the way the splats face. However, no conflict exists if first splat 220 and second splat 222 face each other, or face away from each other.

The front side of first splat 220 and second splat 222 (denoted by arrows) is defined such that ray origin 226 (FIG. 2) is on the front side. In FIG. 4, first splat 220 and second splat 222 are on the front side of each other. Consequently, there is no visibility conflict and first splat 220 and second splat 222 are filtered together in the same object surface.

Figure 5:
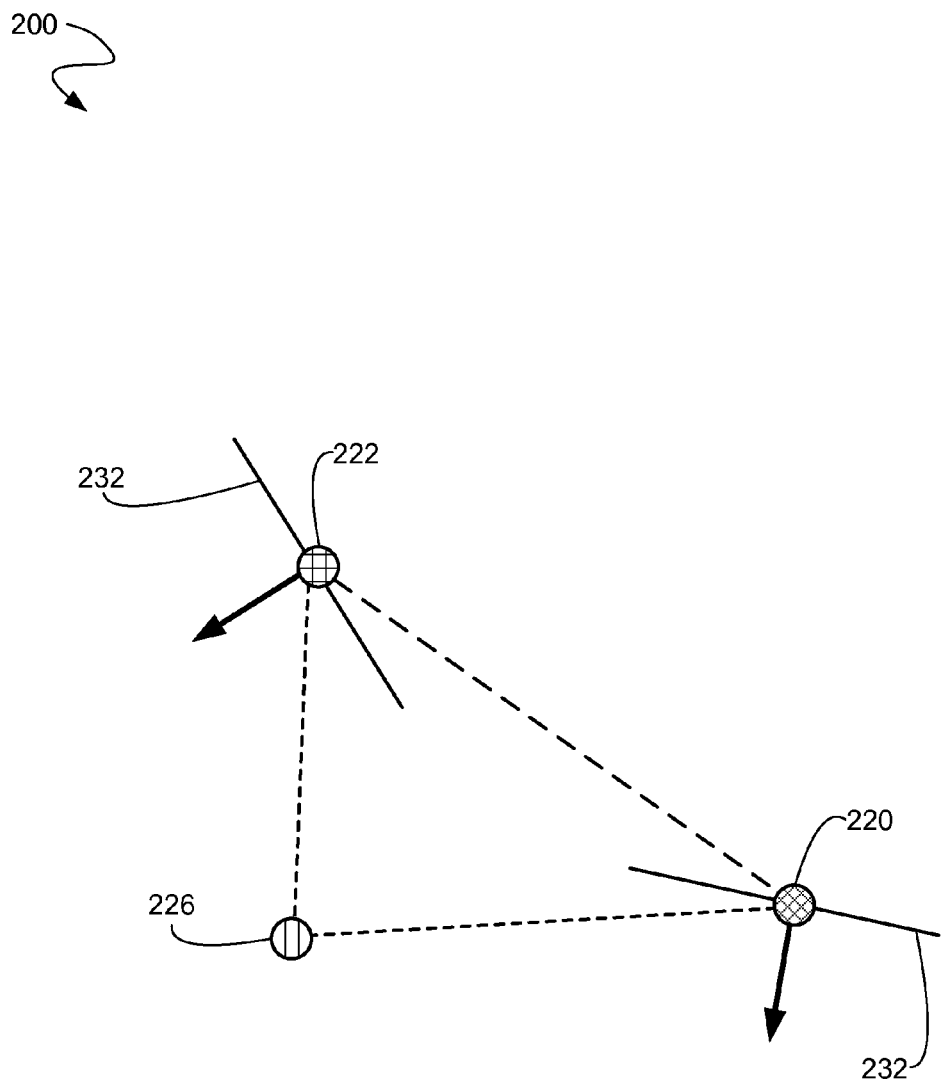
FIG. 5 depicts a first splat and a second splat within an exemplary point-based three dimensional scene, wherein a visibility conflict does not exist, in accordance with one embodiment of the present invention.

FIG. 5 depicts a first splat 220 and a second splat 222 within a point-based three dimensional exemplary scene 200, wherein a visibility conflict does not exist, in accordance with one embodiment of the present invention. As previously mentioned, a conflict may be determined based on the way the splats face. No conflict exists if first splat 220 and second splat 222 face each other, or face away from each other.

FIG. 5 is similar to FIG. 4 except that first splat 220 and second splat 222 are on the back side of each other, rather than the front side of each other as in FIG. 4. Consequently, there is still no visibility conflict and first splat 220 and second splat 222 are filtered together in the same object surface.

Figure 6:
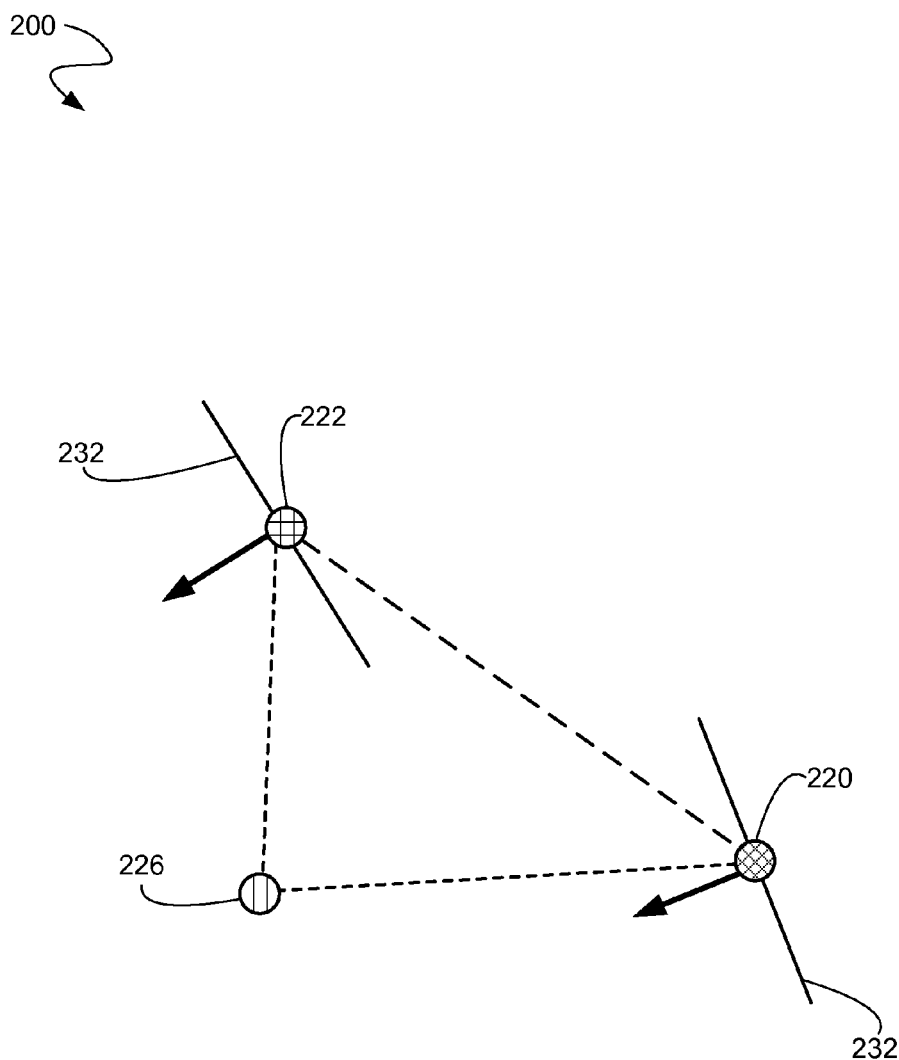
FIG. 6 depicts a first splat and a second splat within an exemplary point-based three dimensional scene, wherein a visibility conflict exists, in accordance with one embodiment of the present invention.

FIG. 6 depicts a first splat and a second splat within a point-based three dimensional exemplary scene, wherein a visibility conflict exists, in accordance with one embodiment of the present invention. As previously mentioned, a conflict may be determined based on the way the splats face. No conflict exists if first splat 220 and second splat 222 face each other, or face away from each other.

FIG. 6 is similar to FIG. 4 and FIG. 5 except that first splat 220 is on the back side of second splat 222, but second splat 222 is on the front side of first splat 220. Consequently, there is a visibility conflict and first splat 220 and second splat 222 are determined to belong to different object surfaces (not shown).

The method described in FIG. 4, FIG. 5 and FIG. 6 may be software implemented or implemented in hardware or both. Example pseudocode follows in Table 2:

TABLE 2

```
// start a new surface
Vec2i samplesInSurface = index range of all remaining samples
bool bConflict = false;
for(int i=samplesInSurface[0]; i<samplesInSurface[1] && !bConflict; i++)
{
    // any crossings with samples already in the current surface?
    for(int j=samplesInSurface[0]; j<i && !bConflict; j++)
    {
        // a pair of samples
        const ReconSample& s1 = samples[i];
        const ReconSample& s2 = samples[j];
        // two-sided primitives: flip the normal
        const Vec3f normal1 = s1.backface ? -s1.normal : s1.normal;
        const Vec3f normal2 = s2.backface ? -s2.normal : s2.normal;
        // consistently facing each other or away from each other?
        float cosAngle1 = dot(normal1,
            (s2.position-s1.position).normalize( ));
        float cosAngle2 = dot(normal2,
            (s1.position-sa2.position).normalize( ));
        // same surface if
        // - angle1>=0 && angle2>=0
        // - angle1<=0 && angle2<=0
        // - optionally could also allow a small z-difference (not shown)
        const float eps = sin(2*FW_PI/180);
        if( (cosAngle1+eps)>=0 && (cosAngle2+eps)>=0 ) continue;
        if( (cosAngle1-eps)<=0 && (cosAngle2-eps)<=0 ) continue;
```

TABLE 2-continued

```
            bConflict = true;
        }
        if(bConflict)
            samplesInSurface[1] = i;
}
```

The implementation of the pseudocode shown in Table 2 above detects a conflict when two object surfaces are on top each other as seen from the origin of the ray, but allows merging of points that come from the same locally flat, convex, or concave object surface.

Figure 7:
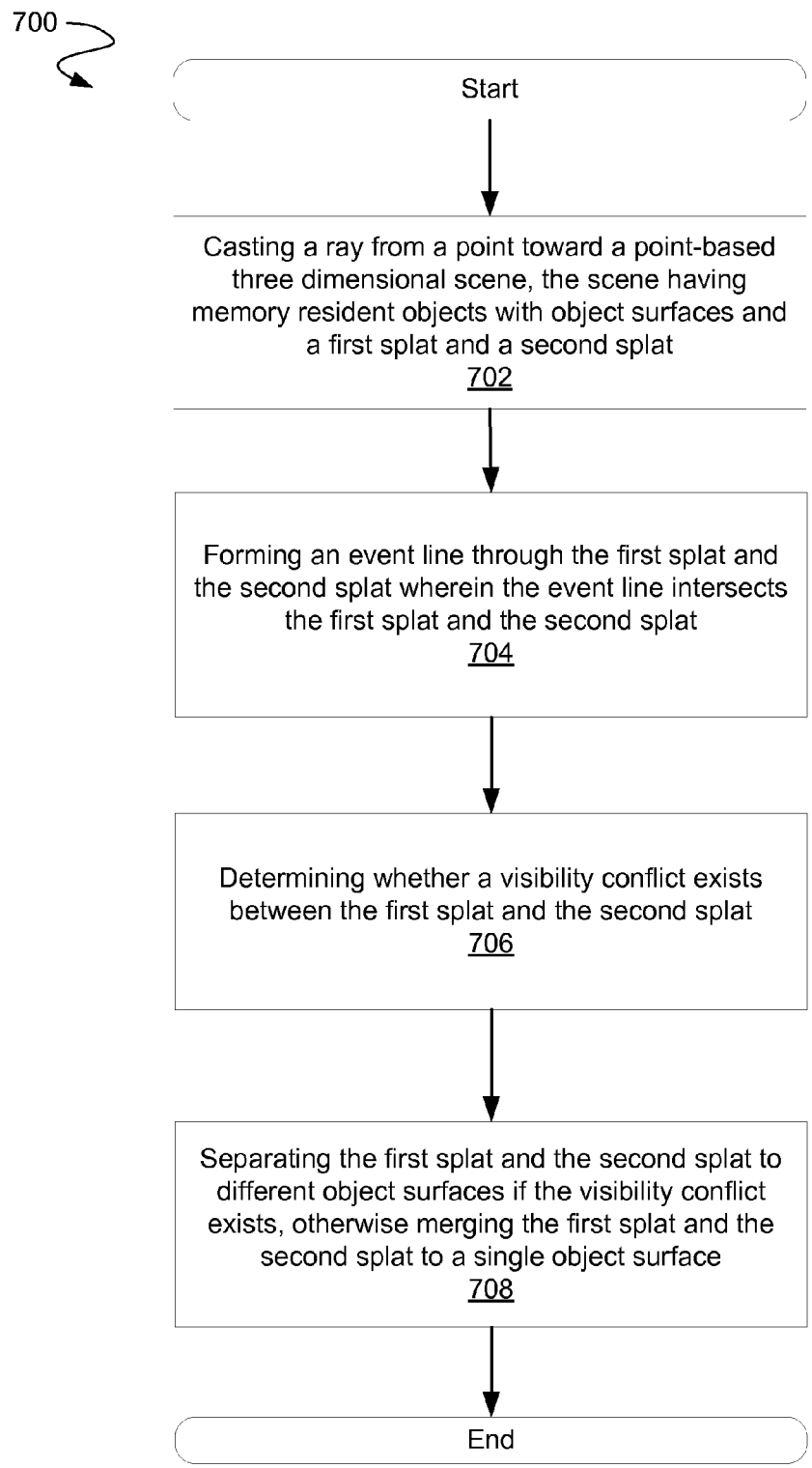
FIG. 7 depicts a flowchart of an exemplary computer graphics process of classifying surfaces within a three dimensional scene for point-based image rendering, in accordance with one embodiment of the present invention.

FIG. 7 depicts a flowchart of an exemplary computer graphics process of classifying surfaces within a three dimensional scene for point-based image rendering, in accordance with one embodiment of the present invention. The computer-controlled process of flowchart 700 may be implemented on the system of FIG. 1. In a block 702, a ray is cast from a point toward a point-based three dimensional scene.

In an embodiment of the present invention, the scene has memory resident objects with object surfaces. The scene also has a first splat and a second splat. The first splat and the second splat have both a position and a normal vector. The first splat and second splat are sample points within the three dimensional scene expressed in terms of circles on tangent planes of intersection points between the ray and the object surfaces.

In another embodiment of the present invention, the point-based 3D scene is operable to be used for high quality computer graphics rendering without triangulation in a computer graphics system.

For example, in FIG. 2, a ray is cast from a point toward the point-based three dimensional scene. The three dimensional scene comprises a first splat and a second splat having both a position and a normal vector.

In a block 704 of FIG. 7, an event line is formed through the first splat and the second splat and intersects the first splat and the second splat.

For example, in FIG. 2, the event line intersecting both the first splat and the second splat is cast. The event line also intersects the plane perpendicular to the origin point of the ray.

In a block 706 of FIG. 7, a determination is made whether a visibility conflict exists between the first splat and the second splat. A visibility conflict is determined as a situation where it is considered possible that two splats (point samples) can occlude each other in the vicinity of the ray. In other words, embodiments of the present invention determine whether a series of splats belong to the same object surface or belong to separate object surfaces within the scene.

In an embodiment of the present invention, determining whether a visibility conflict exists includes computing an intersection point of the event line and the plane and then identifying a conflict if the intersection point lies within a positive half-space of the first splat and the second splat or a negative half-space of the first splat and the second splat. For example, in FIG. 2, a visibility conflict does not exist. In another example, in FIG. 3, a visibility conflict exists. The results of the determining are operable to minimize unpredictable light leaks between the object surfaces.

In another embodiment of the present invention, determining whether a visibility conflict exists includes identifying a conflict if the first splat and the second splat neither face each other nor face away from each other. For example, in FIG. 4 and FIG. 5, a visibility conflict does not exist. In another example, in FIG. 6, a visibility conflict exists. The results of the determining are operable to minimize unpredictable light leaks between the object surfaces.

In a block 708 of FIG. 7, the first splat and the second splat are separated to different object surfaces if the visibility conflict exists, otherwise the first splat and the second splat are merged to a single object surface. For example, in FIG. 2, FIG. 4 and FIG. 5, the first and second splat will be merged to a single object surface. In another example, in FIG. 3 and FIG. 6, the first and second splat will be separated to different object surfaces.

In the foregoing specification, embodiments of the invention have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage, or attribute that is not expressly recited in a claim should limit the scope of such claim in any way. Accordingly, the specification and drawings are to be regarded in an illustrative rather than a restrictive sense.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings.

What is claimed is:

1. A method comprising:
   casting a ray from a point toward a point-based three dimensional scene, said scene comprising:
     memory resident objects with object surfaces; and
     a first splat and a second splat associated with said object surfaces wherein further said first splat and said second splat comprise a position and a normal vector;
   forming an event line through said first splat and said second splat wherein said event line intersects said first splat and said second splat; and
   determining whether a visibility conflict exists between said first splat and said second splat, wherein said determining comprises:
     computing an intersection point of said event line and a plane perpendicular to an origin point of said ray; and
     identifying a conflict if said intersection point lies within a positive half-space of said first splat and said second splat or a negative half-space of said first splat and said second splat.

2. The method of claim 1 further comprising:
   separating said first splat and said second splat to different object surfaces if said visibility conflict exists, otherwise merging said first splat and said second splat to a single object surface.

3. The method of claim 1 wherein said determining comprises:
   identifying a conflict if said first splat and said second splat neither face each other nor face away from each other.

4. The method of claim 1 wherein said first splat and said second splat are sample points within said three dimensional scene in terms of circles on tangent planes of intersection points between said ray and said object surfaces.

5. The method of claim 1 wherein said point-based 3D scene is operable to be used for high quality computer graphics rendering without triangulation in a computer graphics system.

6. The method of claim 1 wherein results of said determining are operable to minimize unpredictable light leaks between said object surfaces.

7. A non-transitory computer readable storage medium having stored thereon, computer executable instructions that, if executed by a computer system cause the computer system to perform a method of ray tracing, said method comprising:
   casting a ray from a point toward a point-based three dimensional scene, said scene comprising:
      memory resident objects with object surfaces; and
      a first splat and a second splat associated with said object surfaces wherein further said first splat and said second splat comprise a position and a normal vector;
   forming an event line through said first splat and said second splat wherein said event line intersects said first splat and said second splat; and
   determining whether a visibility conflict exists between said first splat and said second splat, wherein said determining comprises:
      computing an intersection point of said event line and a plane perpendicular to an origin point of said ray; and
      identifying a conflict if said intersection point lies within a positive half-space of said first splat and said second splat or a negative half-space of said first splat and said second splat.

8. The computer readable storage medium of claim 7, wherein said method further comprises:
   separating said first splat and said second splat to different object surfaces if said visibility conflict exists, otherwise merging said first splat and said second splat to a single object surface.

9. The computer readable storage medium of claim 7 wherein said determining comprises:
   identifying a conflict if said first splat and said second splat neither face each other nor face away from each other.

10. The computer readable storage medium of claim 7 wherein said first splat and said second splat are sample points within said three dimensional scene in terms of circles on tangent planes of intersection points between said ray and said object surfaces.

11. The computer readable storage medium of claim 7 wherein said point-based 3D scene is operable to be used for high quality computer graphics rendering without triangulation in a computer graphics system.

12. The computer readable storage medium of claim 7 wherein results of said determining are operable to minimize unpredictable light leaks between said object surfaces.

13. A system comprising:
   a processor coupled to a computer readable storage media using a bus and executing computer readable code which causes the computer system to perform a method of rendering an image, said method comprising:
      casting a ray from a point toward a point-based three dimensional scene, said scene comprising:
         memory resident objects with object surfaces; and
         a first splat and a second splat associated with said object surfaces wherein further said first splat and said second splat comprise a position and a normal vector;
      forming an event line through said first splat and said second splat wherein said event line intersects said first splat and said second splat; and
      determining whether a visibility conflict exists between said first splat and said second splat, wherein said determining comprises:
         computing an intersection point of said event line and a plane perpendicular to an origin point of said ray; and
         identifying a conflict if said intersection point lies within a positive half-space of said first splat and said second splat or a negative half-space of said first splat and said second splat.

14. The system of claim 13, wherein said method further comprises:
   separating said first splat and said second splat to different object surfaces if said visibility conflict exists, otherwise merging said first splat and said second splat to a single object surface.

15. The system of claim 13 wherein said determining comprises:
   identifying a conflict if said first splat and said second splat neither face each other nor face away from each other.

16. The system of claim 13 wherein said first splat and said second splat are sample points within said three dimensional scene in terms of circles on tangent planes of intersection points between said ray and said object surfaces.

17. The system of claim 13 wherein said point-based 3D scene is operable to be used for high quality computer graphics rendering without triangulation in a computer graphics system and wherein further results of said determining are operable to minimize unpredictable light leaks between said object surfaces.

* * * * *